(No Model.)
J. W. STANTON.
DEVICE FOR SECURING PULLEYS TO SHAFTS.
No. 443,121. Patented Dec. 23, 1890.
Fig. 1
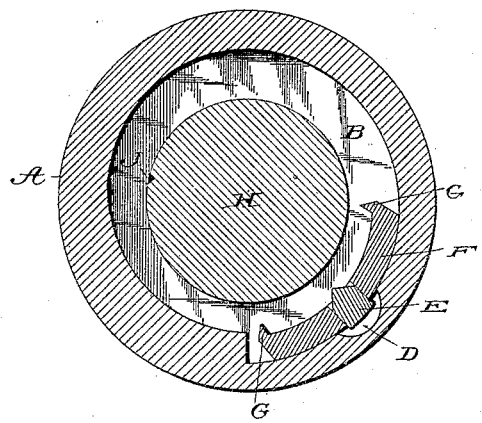
Fig. 2.
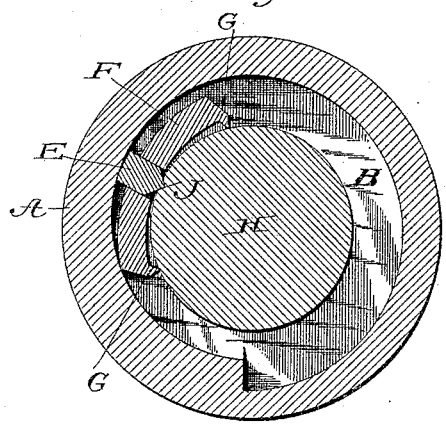
Fig. 3.
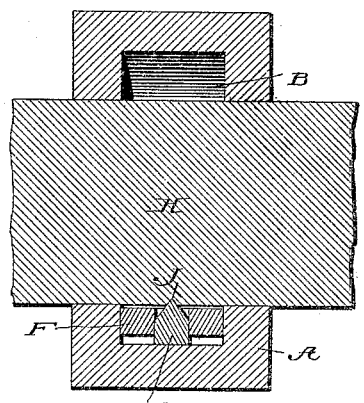
Fig. 4.
Witnesses:
William W. Mortimer
C. S. Hoyer
John W. Stanton
Inventor:
by Wm. N. Moon
Attorney.

UNITED STATES PATENT OFFICE.

JOHN W. STANTON, OF BELDING, MICHIGAN.

DEVICE FOR SECURING PULLEYS TO SHAFTS.

SPECIFICATION forming part of Letters Patent No. 443,121, dated December 23, 1890.

Application filed July 1, 1890. Serial No. 357,336. (No model.)

*To all whom it may concern:*

Be it known that I, JOHN W. STANTON, a citizen of the United States, residing at Belding, in the county of Ionia and State of Michigan, have invented certain new and useful Improvements in Devices for Securing Pulleys on Shafts; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in pulleys, and has especial reference to what may be properly termed an "automatic" clutch-pulley.

My invention relates to improvements in pulleys and devices for securing the same on shafts; and the object of the invention is the provision of simple, inexpensive, and efficient devices of this character.

The invention further consists of a pulley having an eccentric groove, a pin or stud arranged in said groove and adapted to engage a notch or recess in the shaft, and a clutch working in conjunction therewith.

The invention further consists in the novel construction of parts, substantially as herein illustrated, described, and particularly defined by the claims.

Figure 1 represents a vertical section of a pulley embodying my invention in position on the shaft with the clutching devices out of engagement with the shaft. Fig. 2 represents a similar view with the clutching devices engaging the shaft to retain the pulley thereon. Fig. 3 represents a transverse vertical sectional view of the pulley. Fig. 4 represents a vertical section of another form of my improved pulley.

My improved automatic pulley consists of the pulley proper A, provided with the eccentric or cam groove B, the socket or seat D, in which the clutch-pin E normally rests, and the plate F, having the points, barbs, or teeth G, which form the clutch. The plate F is of arc shape or segment form, in order that it may rest in the groove, is provided with an opening to receive the clutch-pin, and the barbs or points thereon are preferably cold-chisel points.

I provide the shaft H with an indentation or notch J, and when it is desired to fit the pulley to the shaft the pulley is slipped on the shaft, the point of the clutch-pin is dropped into the indentation or recess of the shaft, and the pulley is turned, bringing the clutch and clutch-pin in the narrow portion of the groove, and thus securing the clutch-pin in place in the indentation of the shaft and forcing the teeth or points of the clutch against the shaft, as clearly shown, thus securely locking the pulley in place on the shaft, and the teeth will necessarily bite more firmly against the shaft as the strain thereon increases.

In the pulley shown in Fig. 4 I employ merely a clutch F, having one tooth G, which is the more simple, durable, and inexpensive construction.

It will thus be seen that I provide a pulley which comprises but three parts, rendering the same very strong, durable, and cheap; that it is impossible for the pulley to work loose on the shaft, and that it is automatic in its action.

I claim as my invention—

1. A pulley having an eccentric groove and a plate fitting in said groove and having a point or points to engage the shaft for securing the pulley.

2. A pulley having an eccentric groove, a clutch-pin arranged in said groove and adapted to engage the shaft, and a plate having teeth for engaging the shaft for securing the pulley in place.

In testimony whereof I affix my signature in presence of two witnesses.

JOHN W. STANTON.

Witnesses:
SAMUEL A. WALKER,
ALBERT WALKER.